United States Patent [19]
Ozawa et al.

[11] Patent Number: 4,467,347
[45] Date of Patent: Aug. 21, 1984

[54] COLOR IMAGING DEVICE

[75] Inventors: Naoki Ozawa, Kokubunji; Shusaku Nagahara, Hachioji; Kenji Takahashi, Kodaira; Masuo Umemoto; Kazuhiro Sato, both of Tokyo; Morishi Izumita, Inagi; Toshiyuki Akiyama, Kodaira; Masanori Sato, Kokubunji; Koji Kudo, Hachioji, all of Japan

[73] Assignee: Hitachi, Ltd., Tokyo, Japan

[21] Appl. No.: 346,195

[22] Filed: Feb. 5, 1982

[30] Foreign Application Priority Data

Feb. 6, 1981 [JP] Japan .................................. 56-15745

[51] Int. Cl.³ .............................................. H04N 9/07
[52] U.S. Cl. .................................................... 358/44
[58] Field of Search ......................... 358/41, 44, 47, 48

[56] References Cited

U.S. PATENT DOCUMENTS

| 4,104,679 | 8/1978 | Kitamura | 358/44 |
| 4,157,566 | 6/1979 | Nakabe | 358/44 |
| 4,282,547 | 8/1981 | Morishita | 358/44 |
| 4,286,285 | 8/1981 | Rhodes | 358/44 |

Primary Examiner—Michael A. Masinick
Attorney, Agent, or Firm—Antonelli, Terry & Wands

[57] ABSTRACT

The present invention relates to a color imaging device which suppresses false color signals appearing in an area where the difference of brightnesses is great in the horizontal or vertical direction.

When the correlation between picture elements adjacent in the vertical direction is little and the false signal appears in a boundary part in the vertical direction, the false signal is detected, whereupon a color signal is demodulated by utilizing the correlation between the signals of picture elements in the horizontal direction. On the other hand, when the correlation between picture elements adjacent in the horizontal direction is little and the false signal appears in a boundary part in the horizontal direction, the false signal is detected, whereupon a color signal is demodulated by utilizing the correlation between the signals of picture elements in the vertical direction.

As a result, the moiré phenomenon attributed to the false color signals can be conspicuously reduced.

While embodiments of the present invention refer to color imaging devices which employ MOS type solid-state imaging devices, the invention is also applicable to an imaging device which employs CCDs and a color image pickup tube which separates colors by means of a mosaic color filter.

17 Claims, 53 Drawing Figures

FIG. 6(A)

| W₁ | Ye | W₁ | Ye | W₁ | Ye | W₁ | Ye | W₁ | Ye |
|---|---|---|---|---|---|---|---|---|---|
| Cy | W₂ | Cy | W₂ | Cy | W₂ | Cy | W₂ | Cy | W₂ |
| W₁ | Ye | W₁ | Ye | W₁ | Ye | W₁ | Ye | W₁ | Ye |
| Cy | W₂ | Cy | W₂ | Cy | W₂ | Cy | W₂ | Cy | W₂ |

---n

| W₁ | Ye | W₁ | Ye | W₁ | Ye | W₁ | Ye | W₁ | Ye |
|---|---|---|---|---|---|---|---|---|---|
| Cy | W₂ | Cy | W₂ | Cy | W₂ | Cy | W₂ | Cy | W₂ |
| W₁ | Ye | W₁ | Ye | W₁ | Ye | W₁ | Ye | W₁ | Ye |
| Cy | W₂ | Cy | W₂ | Cy | W₂ | Cy | W₂ | Cy | W₂ |

(Figure showing same pixel arrangement with diagonal hatching over right portion, with lines n and n+1 indicated)

FIG. 21

| G | Cy | G | Cy | G | Cy | G | Cy | G | Cy |
|---|----|---|----|---|----|---|----|---|----|
| Ye | G | Ye | G | Ye | G | Ye | G | Ye | G |
| G | Cy | G | Cy | G | Cy | G | Cy | G | Cy |
| Ye | G | Ye | G | Ye | G | Ye | G | Ye | G |
| G | Cy | G | Cy | G | Cy | G | Cy | G | Cy |
| Ye | G | Ye | G | Ye | G | Ye | G | Ye | G |

| W | Ye | W | Ye | W | Ye | W | Ye | W | Ye |
|---|----|---|----|---|----|---|----|---|----|
| R | R | R | R | R | R | R | R | R | R |
| Ye | W | Ye | W | Ye | W | Ye | W | Ye | W |
| R | R | R | R | R | R | R | R | R | R |
| W | Ye | W | Ye | W | Ye | W | Ye | W | Ye |
| R | R | R | R | R | R | R | R | R | R |

---- n
---- n+1

COLOR IMAGING DEVICE

BACKGROUND OF THE INVENTION

The present invention relates to a color imaging device, and more particularly to the suppression of false color signals in a color imaging device of the spatial multiplexing type.

A color imaging device of the spatial multiplexing type wherein a mosaic color filter formed of a plurality of filter elements adapted to transmit light of wavelength regions different from one another are arrayed regularly in the row and column directions and the color filter is arranged in front of the image pickup face of a photoelectric device so as to make it possible to derive two or more different color signals from the single photoelectric device, is suited for an imaging device which can be made small in size and light in weight. Recently, a very small-sized color camera has been realized by employing as the photoelectric device a solid-state imaging device produced by the semiconductor integrated circuit technology and combining it with the spatially-multiplexing color filter.

In the color camera of the spatial multiplexing type, image signals of two or more color components are provided from the photoelectric conversion portion in a predetermined sequence, and are processed by a signal processing circuit designed in accordance with a filter structure so as to be converted into the color signals and a luminance signal. As one aspect of such signal processing, there has been known the form in which at least some of the filter elements constituting the mosaic color filter are made complementary light transmitting filter elements or panchromatic light transmitting filter elements, and the image signals of picture elements corresponding to these filter elements and those of picture elements proximate to the first-mentioned picture elements in the row direction or column direction are added and subtracted, whereby the predetermined color signals are demodulated. According to this form, the utilization factor of light incident on the photoelectric device is higher than in a case where the image signals of respective picture elements are separated by the use of a filter consisting only of primary color light-transmitting filter elements, so that the sensitivity of the camera can be enhanced advantageously. In addition, it becomes possible to obtain stable luminance signals of little moiré in accordance with the arrayal of the filter elements.

However, the above spatial multiplexing method employing the filter elements of the complementary colors premises that the images of the two picture elements to be used for the demodulation operation of the color signal are correlative to each other. Accordingly, it has the disadvantage that a false color signal not existent in an object to-be-imaged is demodulated in a place lacking the correlation, i.e., in a picture element located at the boundary between two patterns in the object to-be-imaged.

SUMMARY OF THE INVENTION

The present invention has for its object to prevent the occurrence of false color signals in the color imaging device of the spatial multiplexing type described above.

In order to accomplish the object, according to the present invention, a color imaging device having a mosaic color filter in which a plurality of sorts of filter elements adapted to transmit lights of wavelength regions different from one another are regularly arrayed in a row directon and a column direction and which includes at least a first filter element adapted to transmit a complement light and a second filter element capable of forming a predetermined color by an operation between a light transmitted therethrough and the complement light, photoelectric conversion means to receive an object image through the color filter, signal readout means to read out image signals of picture elements corresponding to the filter elements in a predetermined sequence from the photoelectric conversion means, and a signal processing circuit which processes the image signals read out and which forms a luminance signal and at least a color signal corresponding to the predetermined color; is characterized in that said color filter has the second filter elements in proximity to the first filter elements respectively in the rows and columns in which said first filter elements are arrayed, and that said signal processing circuit includes first color signal demodulation means to form said color signal by operating two sorts of image signals corresponding to said first and second filter elements, first signal supply means to supply said color signal demodulation means with that of said image signals read out from said photoelectric conversion means which is from the picture element corresponding to said first filter element and those thereof which are from the two picture elements corresponding to said second filter elements situated in the same row and column as those of the aforecited picture element and being proximate to this picture element, and means to generate a control signal dependent upon a direction of a brightness change of the picture to-be-imaged, said first color signal demodulation means being controlled by said control signal, to demodulate said color signal on the basis of a combination of the input image signals dependent upon the direction of the brightness change of said picture to-be-imaged.

BRIEF DESCRIPTION OF THE DRAWINGS

FIGS. 6(A) and 6(B) are diagrams showing the corresponding relations between the color filter and respective pattern changes in the vertical direction and in the horizontal direction;

FIGS. 21 and 22 are arrangement diagrams of other filters which can replace the color filter of FIG. 2, respectively.

DETAILED DESCRIPTION OF THE PREFERRED EMBODIMENTS OF THE INVENTION

Hereunder, in order to facilitate understanding of the present invention, the occurrence of false signals in prior-art devices and several embodiments of the invention with the false signals suppressed will be described in detail with reference to the drawings by taking as an example an imaging device employing a solid-state imaging device.

Figures 1, 2:
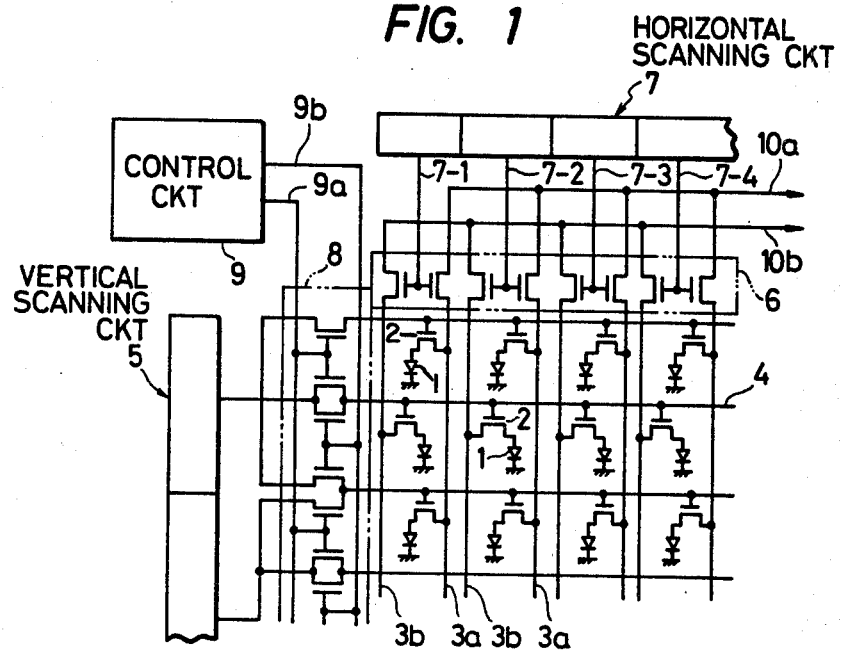
FIG. 1 is an arrangement diagram of a solid-state imaging device which is applicable to the device of this invention.
FIG. 2 is an arrangement diagram of a spatiallymultiplexing color filter which is applicable to the device of this invention.

FIG. 1 shows an example of the construction of a MOS type solid-state imaging device wherein a large number of photosensors are arrayed in two dimensions in the surface of a semiconductor substrate and wherein image signals stored in the respective photosensors in accordance with the quantities of incident light are sequentially read out through MOS type field effect transistors (hereinbelow, simply termed "FETs"). In the figure, numeral 1 designates a photodiode which forms the photosensor, and numeral 2 a vertical switching FET which serves to read out the signal of the corresponding photosensor onto a vertical signal line 3a or 3b. The vertical switches 2 which belong to an identical horizontal line are connected to a common driving line 4, and are simultaneously turned "on" and "off" by a vertical scanning pulse which is impressed on the driving line from a vertical scanning circuit 5 and through a switching circuit 8. Numeral 6 indicates a horizontal switching FET circuit by which the signals of the respective picture elements read out on the vertical signal lines 3a and 3b are respectively delivered onto output lines 10a and 10b, and the respective horizontal switches of which are sequentially turned "on" and "off" by horizontal scanning pulses supplied from a horizontal scanning circuit 7 onto control lines 7-1, 7-2, .... In the illustrated solid-state imaging device, in each horizontal scanning period, the vertical switches of adjoining two rows are simultaneously rendered conductive, and the image signals of the picture elements of the two rows can be simultaneously read out on the output lines 10a and 10b. The switching circuit 8 interposed between the vertical scanning circuit 5 and the driving lines 4 is for interlacing. A control circuit 9 supplies control pulses to a control line 9a in an odd field, and to a control line 9b in an even field. Thus, the combinations of the two rows to be simultaneously read out in the respective horizontal scanning periods deviate one row between the adjacent odd and even fields.

An example of a color filter for spatial multiplexing as is used in combination with the foregoing solid-state imaging device is shown in FIG. 2. This filter is so arranged that any four adjoining elements including two elements in each of the vertical and horizontal directions consist of panchromatic light transmitting filter elements $W_1$ and $W_2$, a cyan light transmitting filter element $C_y$ and a yellow light transmitting filter element $Y_e$, and that the panchromatic light transmitting filter element $W_1$ or $W_2$ lies above or below, or on the right or left of, the element $C_y$ or $Y_e$.

Each of the filter elements has a size in which it lies on the photodiode 1 of the solid-state imaging device. When the outputs of the photodiodes corresponding to the filter elements $W_1$, $W_2$, $C_y$ and $Y_e$ are called a $W_1$ signal, a $W_2$ signal, a $C_y$ signal and a $Y_e$ signal, respectively, the $W_1$ and $Y_e$ signals and the $C_y$ and $W_2$ signals are alternately provided from the respective output lines 10a and 10b of the solid-state imaging device of FIG. 1 to which this color filter is applied. The relations among the respective signals and the three primary colors (R, G and B) are:

$$W_1 = W_2 = R + G + B \tag{1}$$

$$C_y = G + B \tag{2}$$

$$Y_e = R + G \tag{3}$$

Figure 3:
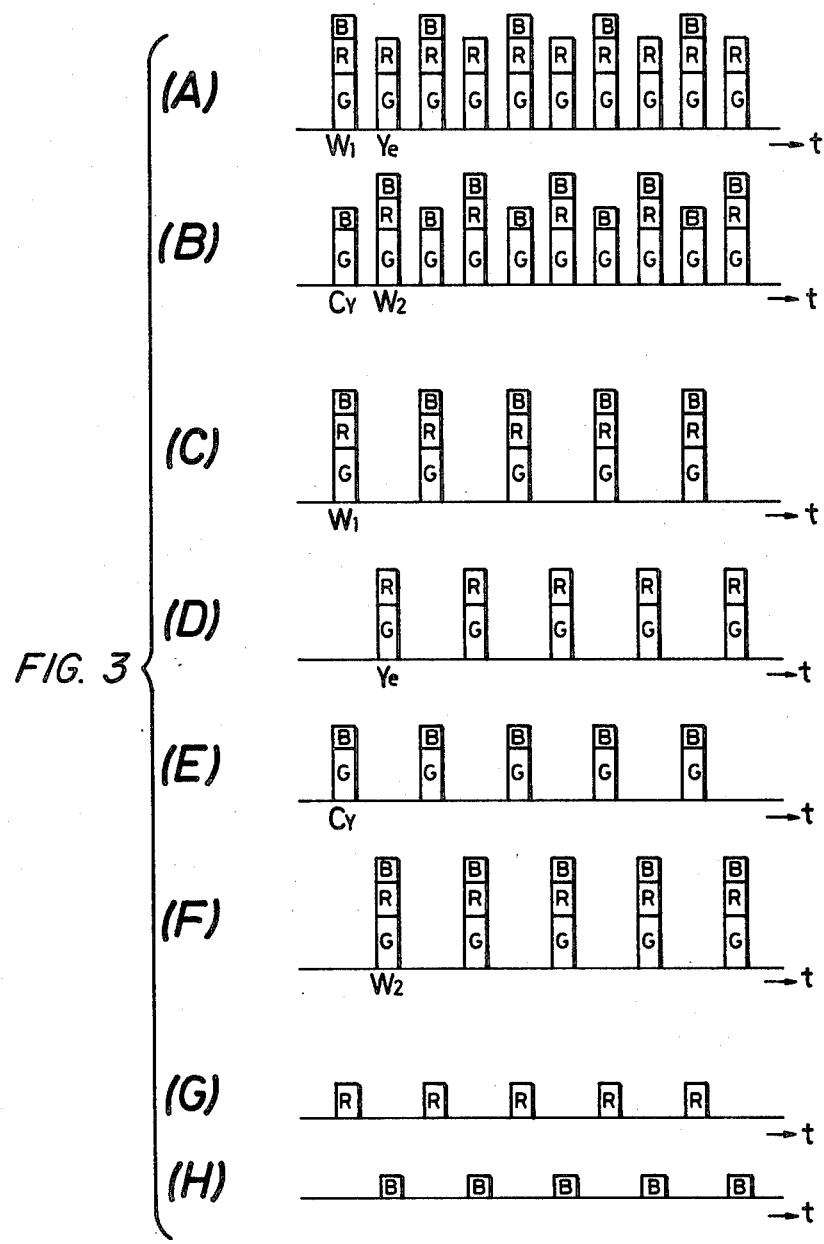
FIGS. 3(A)-3(H) are signal diagrams for explaining principles for demodulating color signals in the case where the color filter and the solid-state imaging device are combined.

Therefore, the respective outputs of the output lines 10a and 10b are simulated as shown in FIGS. 3(A) and 3(B).

Figure 4:
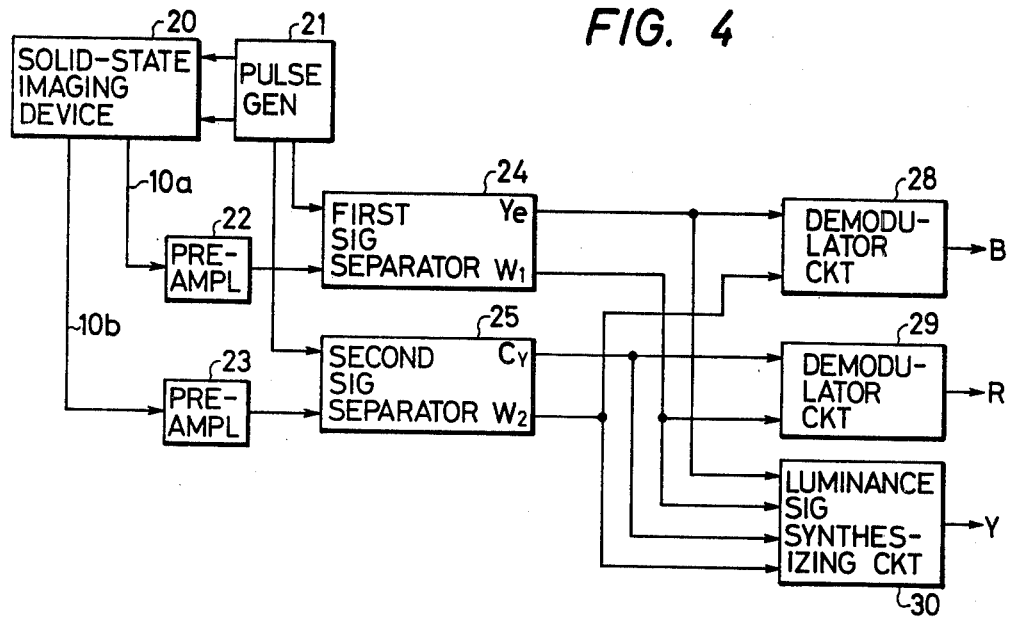
FIGS. 4 and 5 are block diagrams of prior-art color imaging devices, respectively.

FIG. 4 shows a known signal processing circuit which has been employed for producing a luminance signal Y and the color signals R and B from the image signals read out on the two output lines 10a and 10b. Referring to the figure, numeral 20 indicates the solid-state imaging device elucidated in FIG. 1, and numeral 21 a pulse generator circuit for generating various pulses. Shown at numerals 22 and 23 are pre-amplifiers. Numeral 24 designates a first signal separator circuit which separates the signal from the output line 10a amplified by the pre-amplifier 22, into the $W_1$ signal and the $Y_e$ signal as respectively shown in FIGS. 3(C) and 3(D), while numeral 25 designates a second signal separator circuit which separates the signal from the output line 10b amplified by the pre-amplifier 23, into the $C_y$ signal and the $W_2$ signal as respectively shown in FIGS. 3(E) and 3(F). As apparent from FIGS. 3(C)-3(F), the $W_1$ and $C_y$ signals and the $Y_e$ and $W_2$ signals are simultaneously provided, respectively. Accordingly, the R signal is obtained as shown in FIG. 3(G) by applying the $W_1$ and $C_y$ signals to a demodulator circiut 29 and executing an operation of $(W_1 - C_y)$. Likewise, when the $Y_e$ and $W_2$ signals are applied to a demodulator circuit 28 to execute an operation of $(W_2 - Y_e)$, the B signal is obtained as shown in FIG. 3(H). Numeral 30 indicates a luminance signal synthesizing circuit which combines the respective signals $W_1$, $Y_e$, $W_2$ and $C_y$ to produce the luminance signal Y.

Figure 5:
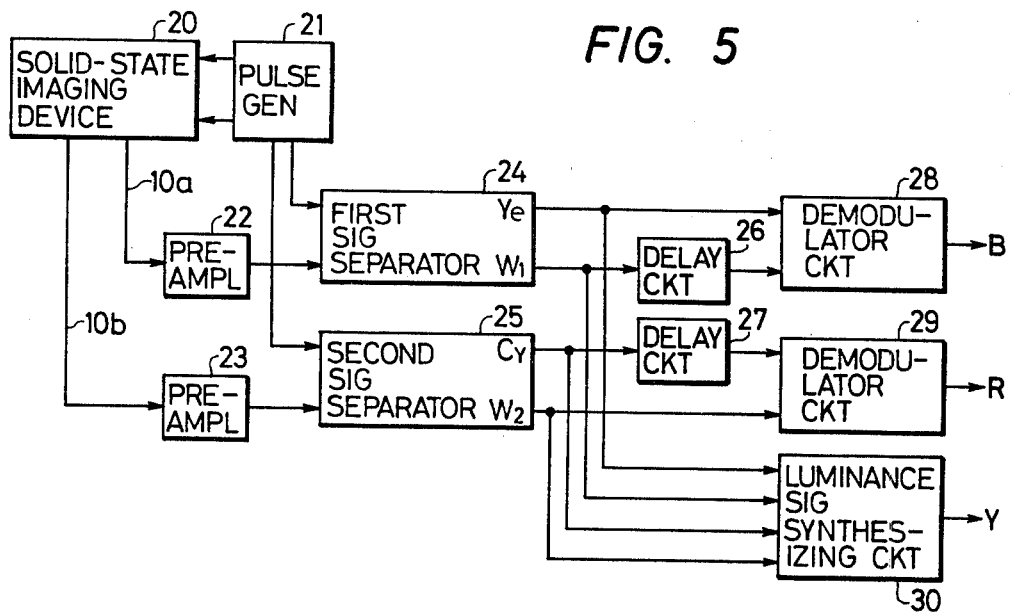

The signal processing circuit described above demodulates the color signals R and B by utilizing the correlations of a picture in the vertical direction. In case of the filter in FIG. 2, these color signals can also be produced from picture element signals adjoining each other in the horizontal direction. More specifically, as shown in FIG. 5, when the $W_1$ signal is applied to the demodulator circuit 28 through a delay circuit 26 having a delay time corresponding to one picture element and an operation of $(W_1-Y_e)$ is executed, the B signal is obtained. On the other hand, the $C_y$ signal is applied to the demodulator circuit 29 through a delay circuit 27 having the same delay time as that of the delay circuit 26, and an operation of $(W_2-C_y)$ is executed, whereby the R signal is obtained.

Now, let's consider cases where these signal processing circuits are used to process the imaged outputs of objects having brightness changes as shown in FIGS. 6(A) and 6(B).

Figure 7:
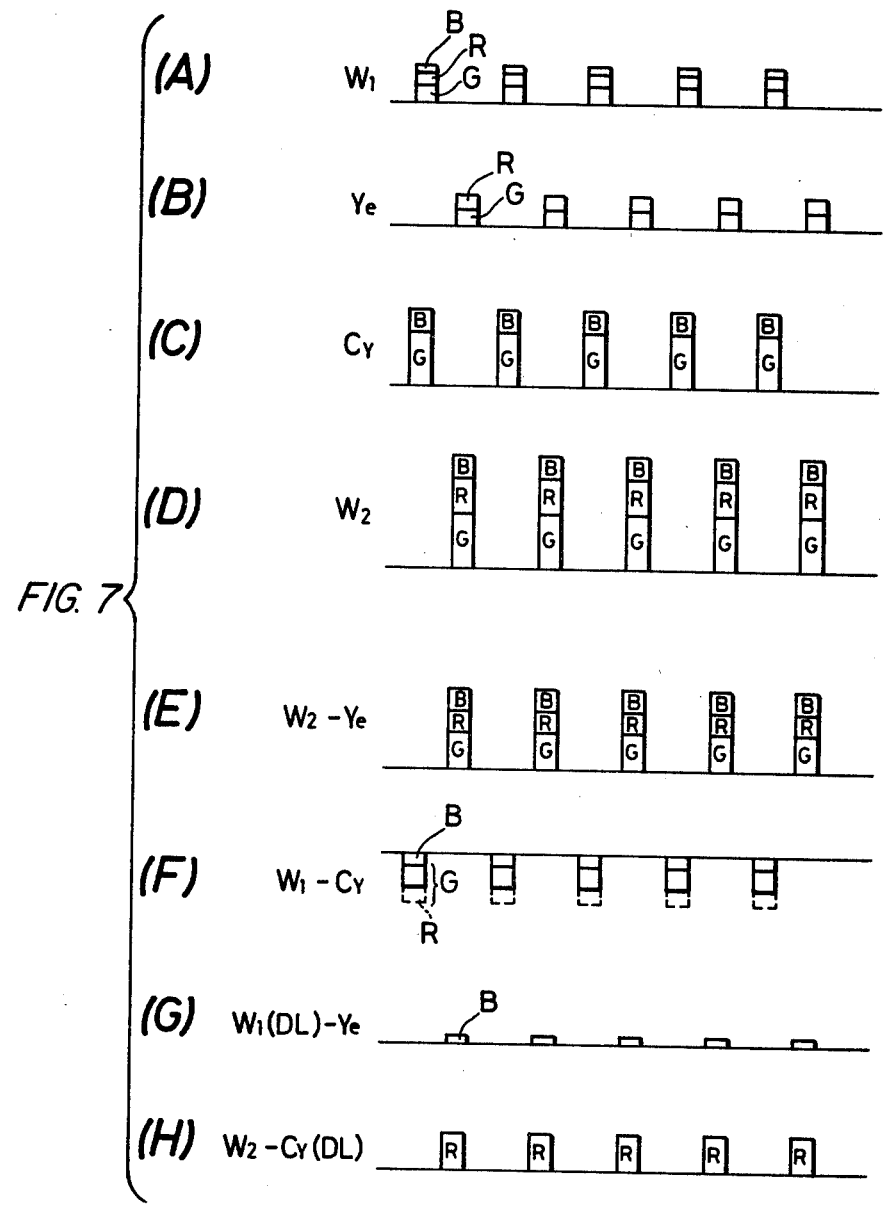
FIGS. 7(A)-7(H) are signal diagrams for explaining the signal demodulating operations of the prior-art device at the time when the pattern of FIG. 6(A) is imaged.

FIG. 6(A) illustrates a situation where the brightness change has arisen in the vertical direction. Assuming now that the light quantity of a dark area indicated by hatching is about ⅓ of the light quantity of a bright area, the signals $W_1$, $Y_e$, $C_y$ and $W_2$ which have been separated from the imaged outputs of the n-th row and (n−1)-th row located at the boundary between the bright and dark areas are as shown in FIGS. 7(A), 7(B), 7(C) and 7(D), respectively. With the signal processing circuit of FIG. 4, accordingly, the output of the B signal demodulating circuit 28 which executes the operation of $(W_2-Y_e)$ has R and G components mixed therein as depicted in FIG. 7(E). Also the output of the R signal demodulating circuit 29 which executes the operation of $(W_1-C_y)$ has G and B components mixed therein as depicted in FIG. 7(F). On the other hand, with the signal processing circuit of FIG. 5, the B signal is demodulated by the operation between the $Y_e$ signal and the $W_1$ signal delayed a time corresponding to one picture element (termed "$W_1$(DL) signal"), so that the correct B signal is obtained as shown in FIG. 7(G). Also the R signal which is demodulated by the operation between the $W_2$ signal and the $C_y$ signal delayed the time corresponding to one picture element (termed "$C_y$(DL)") becomes the correct color signal as shown in FIG. 7(H).

Figure 8:
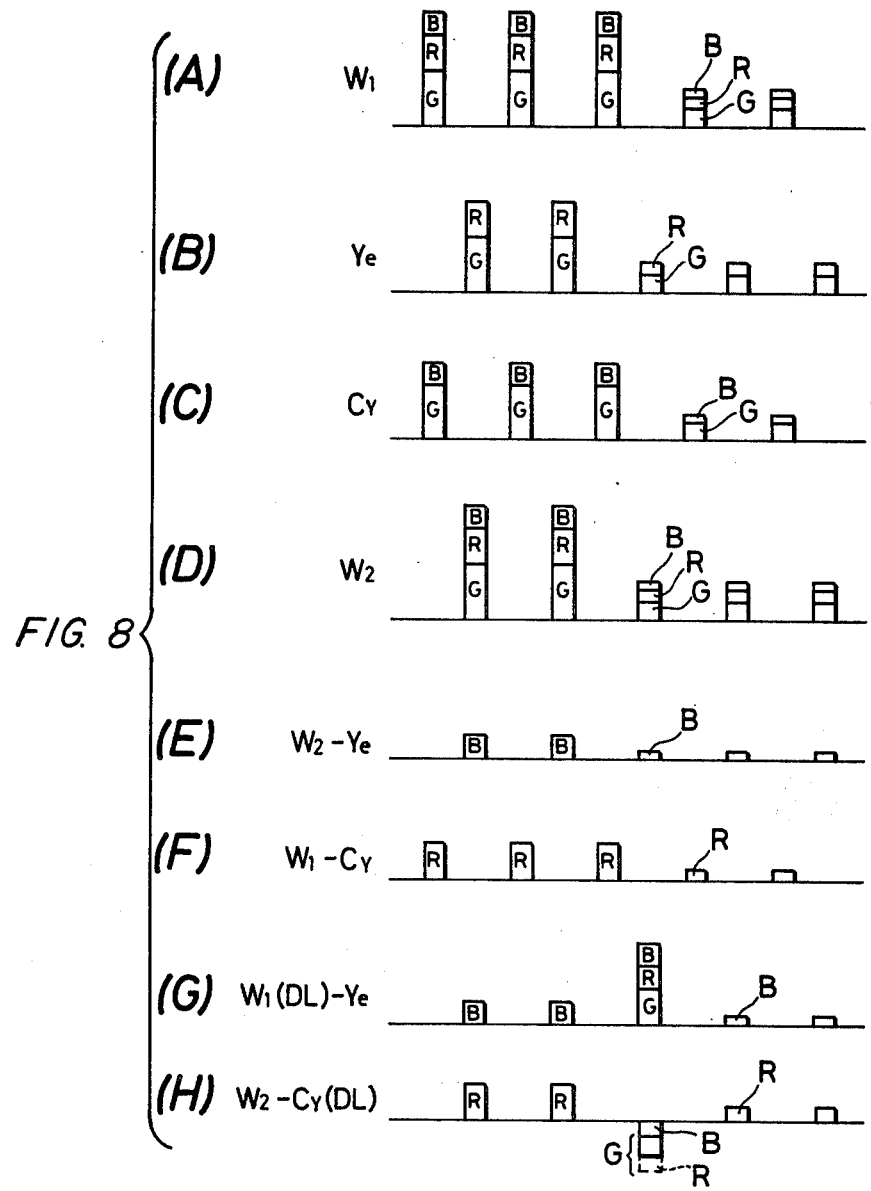
FIGS. 8(A)-8(H) are signal diagrams for explaining the signal demodulating operations of the prior-art device at the time when the pattern of FIG. 6(B) is imaged.

FIG. 6(B) illustrates a situation where the brightness change has arisen in the horizontal direction. The signals $W_1$, $Y_e$, $C_y$ and $W_2$ separated from the imaged outputs of the n-th row and the (n−1)-th row become as shown in FIGS. 8(A), 8(B), 8(C) and 8(D), respectively. In this case, the B signal and R signal by the signal processing circuit of FIG. 4 become the correct signals as depicted in FIGS. 8(E) and 8(F) respectively, but the B signal and R signal by the signal processing circuit of FIG. 5 become as depicted in FIGS. 8(G) and 8(H) respectively and undergo color mixture in the boundary part between bright and dark areas.

It is understood from the above description that when the color signals are demodulated from the signals of the upper and lower picture elements by exploiting the vertical correlations of the picture, the false color signals appear in the boundary part between the two patterns in the vertical direction, while when the color signals are demodulated from the signals of the right and left adjoining picture elements by exploiting the correlations of the picture in the horizontal direction, the false color signals appears in the boundary part between the patterns in the horizontal direction.

The present invention is therefore constructed so that, in case where a false signal appears in the boundary part between two patterns in the vertical direction, it is detected, whereupon a color signal is demodulated by utilizing the correlation of the signals of picture elements in the horizontal direction and that, in case where a false signal appears in the boundary part between two patterns in the horizontal direction, it is detected, whereupon a color signal is demodulated by utilizing the correlation of the signals of picture elements in the vertical direction.

There will now be described the embodiments of the color imaging device according to this invention in which the appearance of the false color signals in the boundaries between the patterns in the horizontal and vertical directions is suppressed.

EXAMPLES

Figure 9:
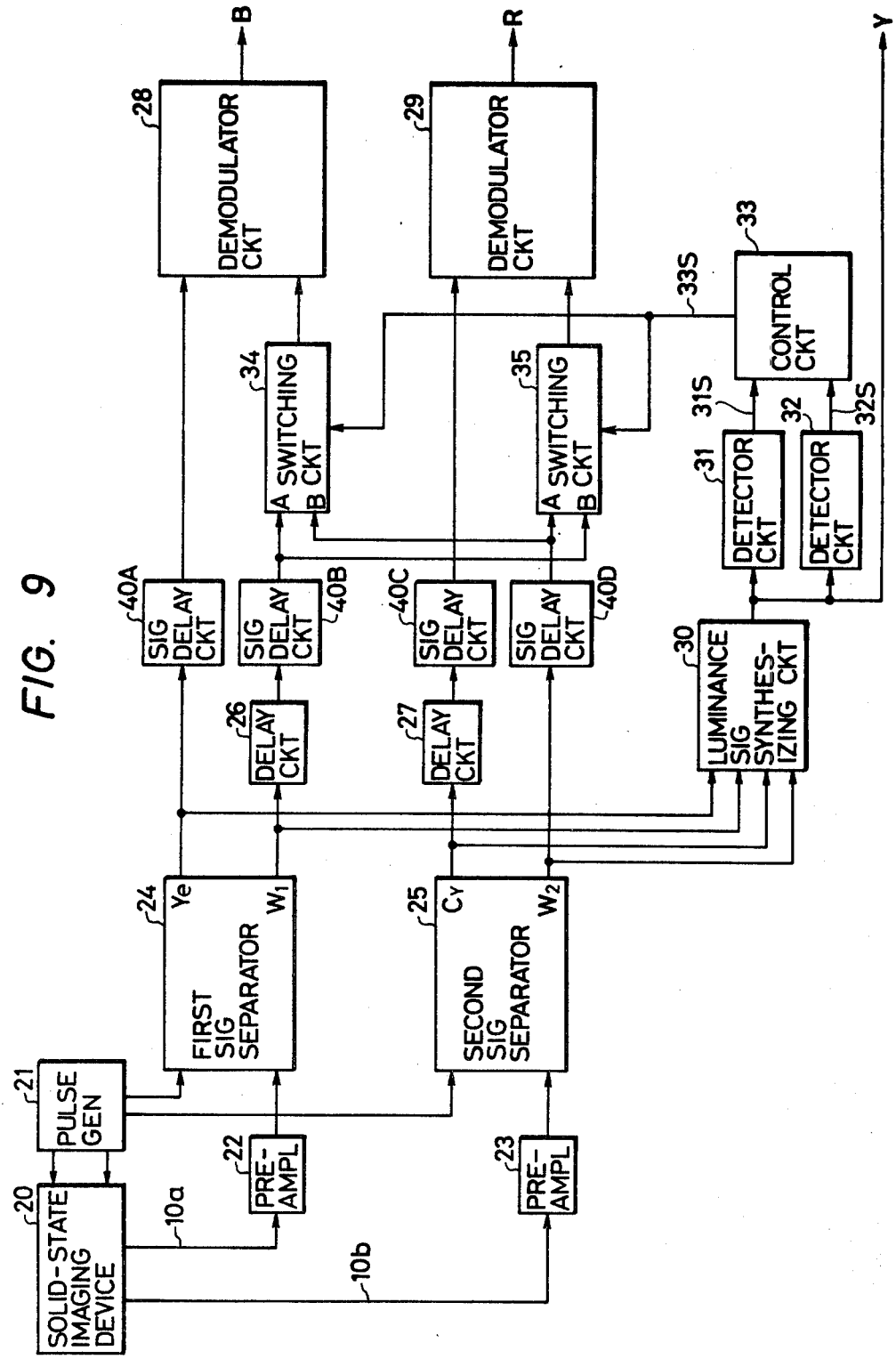
FIG. 9 is a device block diagram showing a first embodiment of the color imaging device according to this invention.

FIG. 9 shows the first embodiment of the color imaging device according to the present invention. In the figure, numerals 20–30 indicate the same consitituents as in FIGS. 4 and 5 explained previously. Numeral 31 designates a circuit which detects the boundary of patterns appearing in the horizontal direction of a picture, from the Y signal provided from the luminance signal synthesizing circuit 30, while numeral 32 designates a circuit which detects from the Y signal the boundary of patterns appearing in the vertical direction of the picture. A circuit 33 generates a control signal 33S in accordance with outputs 31S and 32S from the two boundary detector circuits 31 and 32. Numerals 34 and 35 designate switching circuits which select either the $W_1$(DL) signal obtained by delaying the output of the separator circuit 24 the time corresponding to one picture element by means of the delay circuit 26 or the $W_2$ signal provided from the separator circuit 25, in accordance with the control signal 33S from the circuit 33 and which apply it to the demodulator circuits 28 and 29, respectively. The demodulator circuit 28 or 29 is supplied with the $Y_e$ signal from the separator circuit 24 or the $C_y$ signal from the separator circuit 25 as another input. Constituents 40A–40D inserted in the output circuits of the separator circuits 24 and 25 are signal delay circuits for correcting time deviations between the respective signals $Y_e$, $W_1$, $C_y$ and $W_2$ and the control signal 33S.

In this embodiment, the switching circuits 34 and 35 are controlled so as to select the inputs of terminals A while the pattern boundary is appearing in the vertical direction, and to select the inputs of terminals B when the pattern boundary appears in the horizontal direction. That is, this signal processing circuit demodulates the color signals by the operation of the prior-art circuit of FIG. 5 in a picture portion corresponding to FIG. 6(A) and by the operation of the prior-art circuit of FIG. 4 in a picture portion corresponding to FIG. 6(B), thereby to effectively suppress the generation of the false signals in the boundaries of the patterns.

Figure 10:
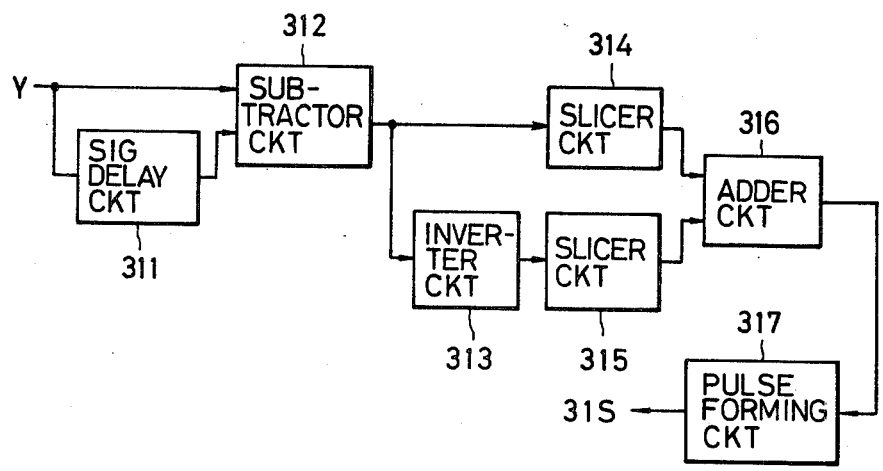
FIG. 10 and FIGS. 11(A)-11(G) are a concrete circuit arrangement diagram of a circuit in FIG. 9 for detecting a pattern boundary in the horizontal direction, and signal waveform diagrams for explaining the operation of the circuit, respectively.

A concrete example of arrangement of the circuit 31 for detecting the pattern boundary in the horizontal direction as shown in FIG. 10. In the figure, numeral 311 designates a signal delay circuit having a very short delay time, numeral 312 a subtractor circuit, numeral 313 an inverter circuit, numerals 314 and 315 slicer circuits, numeral 316 an adder circuit, and numeral 317 a pulse forming circuit. The operation of this circuit will be described on the assumption of a case where the luminance signal Y has a waveform in FIG. 11(A). This signal and a signal of a waveform in FIG. 11(B) as delayed by the delay circuit 311 are subjected to a subtraction, whereby the subtracter circuit 312 provides a signal of a waveform in FIG. 11(C). This signal has its positive part sampled by the slicer circuit 316 and thus becomes a signal of a waveform in FIG. 11(D), which is applied to one terminal of the adder circuit 314. The output of the subtractor circuit 312 as inverted by the inverter circuit 313 is applied to the slicer circuit 315 and becomes a signal of a waveform in FIG. 11(E), which is applied to the other terminal of the adder circuit 316. The adder circuit adds these two input signals, and delivers a signal of a waveform shown in FIG. 11(F). This signal is binary-coded by the pulse forming circuit 317, and is delivered as the detection signal 31S of a waveform shown in FIG. 11(G).

Figure 11:
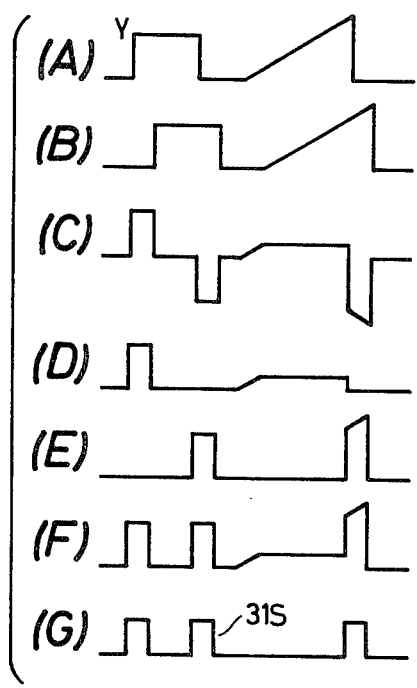

As understood by comparing the waveforms of FIGS. 11(A) and 11(G), the detection signal 31S generates pulses at the points of time when the luminance signal Y changes abruptly.

The circuit 32 for detecting the pattern boundary in the vertical direction may be an arrangement in which the signal delay circuit 311 in the above-stated detector circuit in FIG. 10 is replaced with a signal delay circuit having a delay time equal to one horizontal period. Thus, the detection signal 32S is obtained which generates pulses at the points of time when the luminance signal Y changes in the vertical direction.

Figure 12:
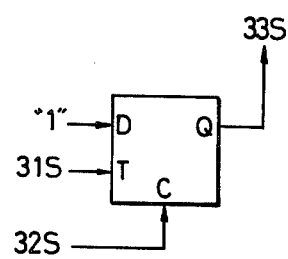
FIG. 12 and FIGS. 13(A)-13(C) are a concrete circuit diagram of a circuit in FIG. 9 for generating a control signal, and the signal waveform diagrams for explaining the operation of the circuit, respectively.
Figure 13:
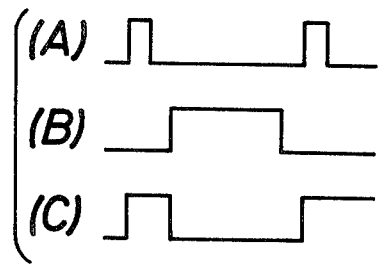

The circuit 33 for generating the control signal 33S can be constructed of, for example, a D-type flip-flop shown in FIG. 12. An input of level "1" is applied to a data input terminal D, and the detection signals 31S and 32S are respectively applied to a trigger input terminal T and a clear terminal C. Then, when by way of example the detection signals 31S and 32S have waveforms in FIGS. 13(A) and 13(B) respectively, the output signal 33S of a waveform shown in FIG. 13(C) is provided at an output terminal Q. The signal 33S becomes "1" when the boundary of the patterns has been detected in the horizontal direction, and becomes "0" when the boundary of the patterns has been detected in the vertical direction. Accordingly, the switching circuits 34 and 35 in FIG. 9 to be controlled by the signal 33S may be constructed so as to select the inputs A when the signal 33S is "0" and to select the inputs B when it is "1". As apparent by comparing the waveforms of FIGS. 13(A) and 13(C), the output signal 31S of the detector circuit 31 may well be used as the control signal of the switching circuits 34 and 35. In this case, the detector circuit 32 and the control circuit 33 can be omitted. In addition, when the switching circuits 34 and 35 are designed so as to select the inputs B for a control signal "0" and the inputs A for "1", these switching circuits can be controlled with the output signal 32S of the detector circuit 32, and it is possible to omit the circuits 31 and 33.

Figure 14:
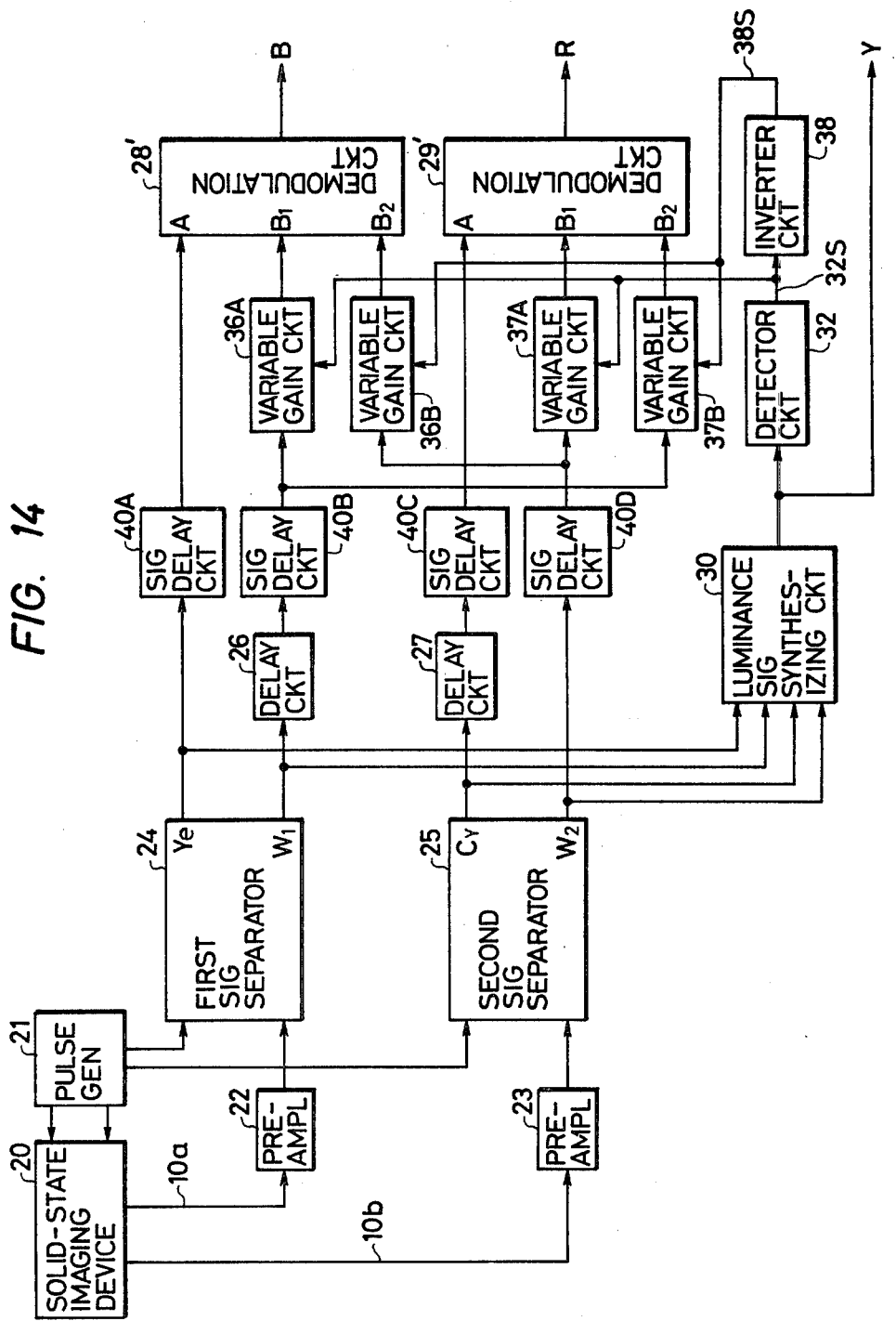
FIGS. 14-17 are device block diagrams each showing another embodiment of the color imaging device according to this invention.

FIG. 14 shows the second embodiment of the present invention which is a modification of the circuit arrangement of FIG. 9. In this embodiment, the switching circuits 34 and 35 are replaced with variable gain circuits 36A and 36B and ones 37A and 37B. The variable gain circuit 36A which applies the $W_1(DL)$ signal to a demodulation circuit 28' and the variable gain circuit 37A which applies the $W_2$ signal to a demodulation circuit 29' are controlled with the detection signal of the circuit 32' for detecting the pattern boundary in the vertical direction, while the other two variable gain circuits 36B and 37B are controlled with a control signal 38S obtained by inverting the aforementioned detection signal by means of an inverter circuit 38. Here, each of the variable gain circuits is set so as to exhibit a gain of 1 (unity) when the control signal is at the "1" level and a gain of 0 (zero) when it is at the "0" level. Then, in the boundary part of the patterns in the vertical direction, the B signal is demodulated from the $W_1(DL)$ and $Y_e$ signals lying in the lateral relationship, and the R signal is demodulated from the $C_y(DL)$ and $W_2$ signals. In any other region, the B signal and the R signal are respectively demodulated from the $W_2$ and $Y_e$ signals lying in the vertical relationship and from the $C_y(DL)$ and $W_1(DL)$ signals. Each of the demodulator circuits 28' and 29' in this case is so constructed as to demodulate the corresponding color signal by subtracting the input signal of a terminal A from the added value of the input signals of terminals $B_1$ and $B_2$.

In case where the detector circuit 32 delivers the detection signal 32S in the form in which it is not binary-coded, the respective variable gain circuits provide the $W_1(DL)$ signal or the $W_2$ signal in a magnitude corresponding to the variation of the luminance signal. Accordingly, when such detection signal is used as the control signal, the demodulator circuit 28' or 29' combines the W signals from the two picture elements adjacent on the upper side and the left side and demodulates the color signal on the basis of the operation between the result and the $Y_e$ or $C_y(DL)$ signal.

Figure 15:
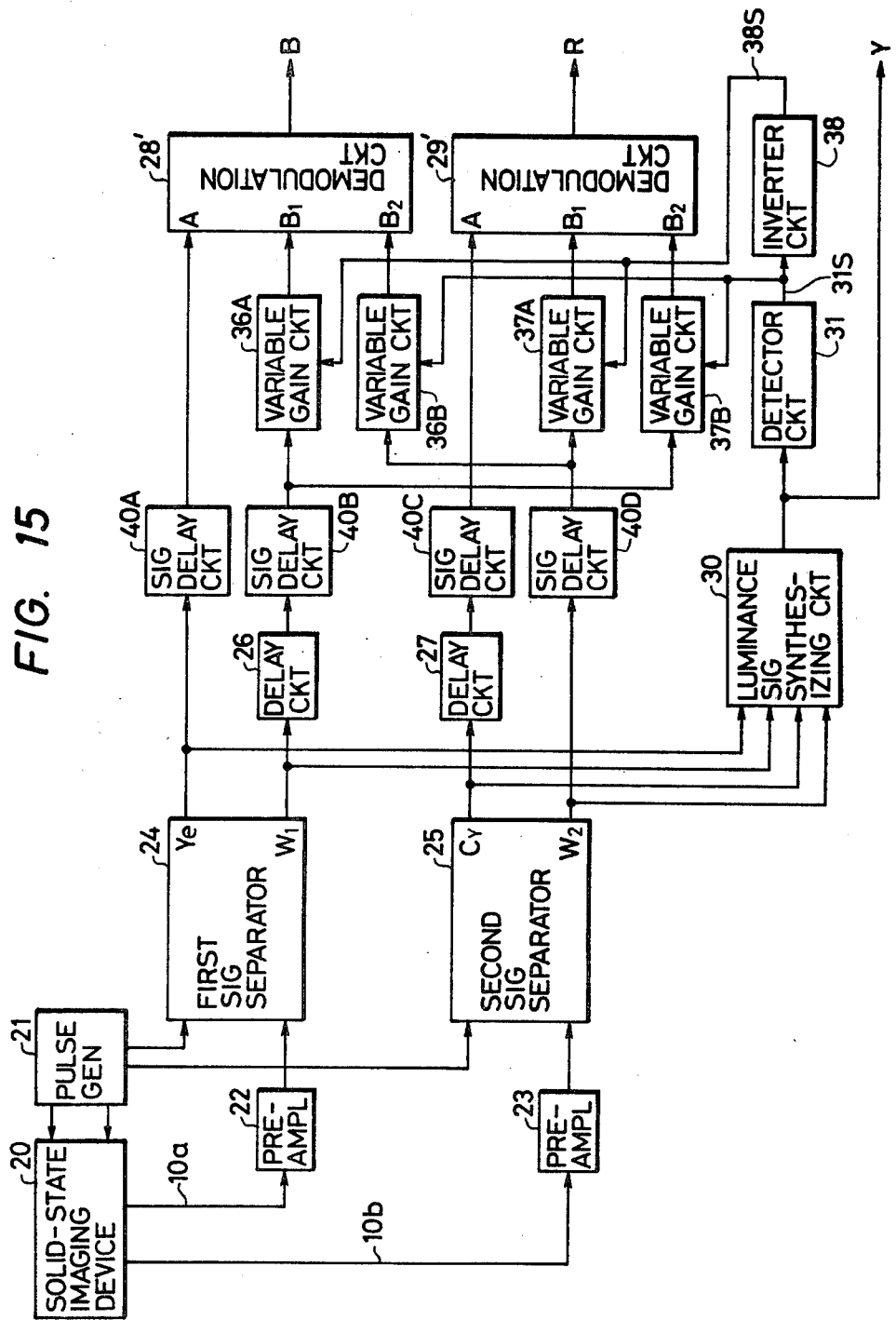

FIG. 15 shows the third embodiment of the present invention. In this embodiment, the circuit 31 for detecting the boundary of the patterns in the horizontal direction is used instead of the detector circuit 32 in the second embodiment. The variable gain circuits 36B and 37B are controlled with the detection signal 31S, while the variable gain circuits 36A and 37A are controlled with the inverted signal 38S.

Figure 16:
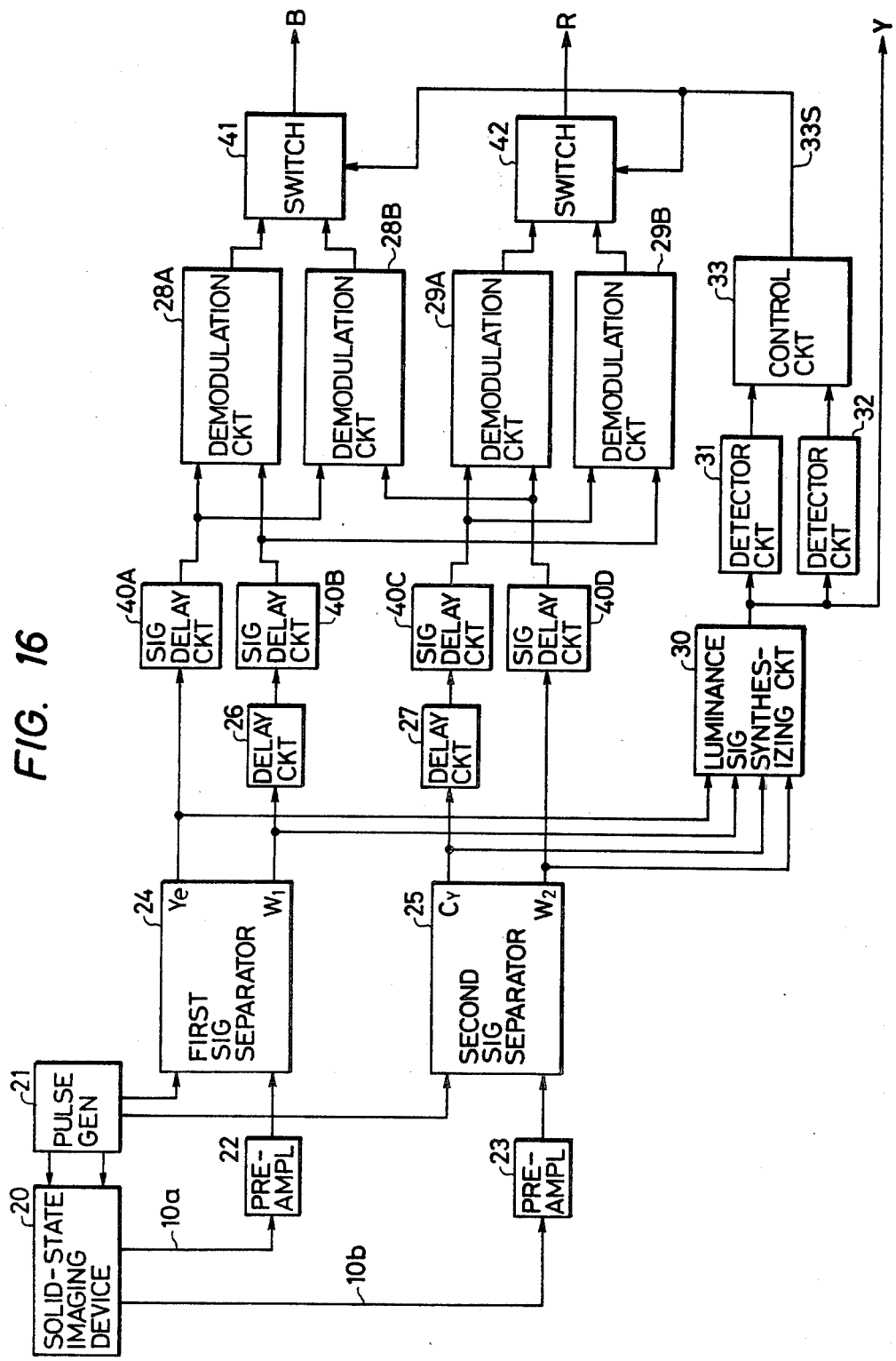
Figure 17:
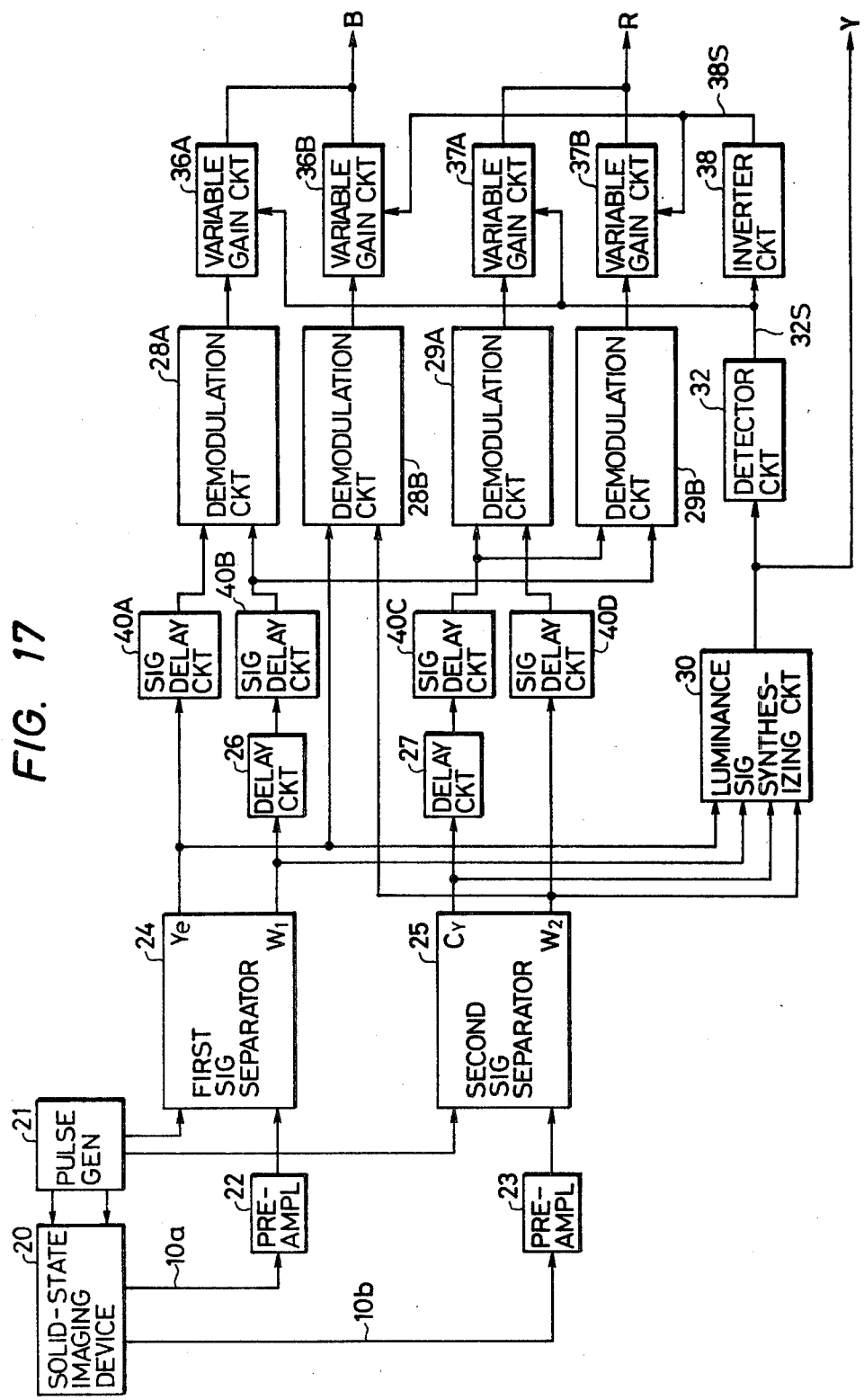

All the three embodiments described above are of the form in which the R signal demodulating circuit and the B signal demodulating circuit are supplied with the $W_1(DL)$ signal and the $W_2$ signal selectively in accordance with the direction of the brightness change of the picture. It is also allowed, however, that as shown in FIG. 16 by way of example, each color signal circuit is provided with two demodulation circuits 28A and 28B, or 29A and 29B so as to select the output color signals of these demodulation circuits by means of a switch 41 or 42. In this case, the demodulation circuit 28A executes the operation of $W_1(DL) - Y_e$, 28B executes $W_2 - Y_e$, 29A executes $W_2 - C_y(DL)$, and 29B executes $W_1(DL) - C_y(DL)$. The control of the switch 41 or 42 can be made with a circuit as in the first embodiment of FIG. 9. It is also allowed that as shown in FIG. 17, two demodulation circuits 28A and 28B, or 29A and 29B are disposed for each color signal so as to control the outputs of the respective demodulation circuits by means of variable gain circuits 36A, 36B, 37A and 37B. A circuit as in the second embodiment or the third embodiment can be applied to the gain control of these variable gain circuits.

Figure 18:
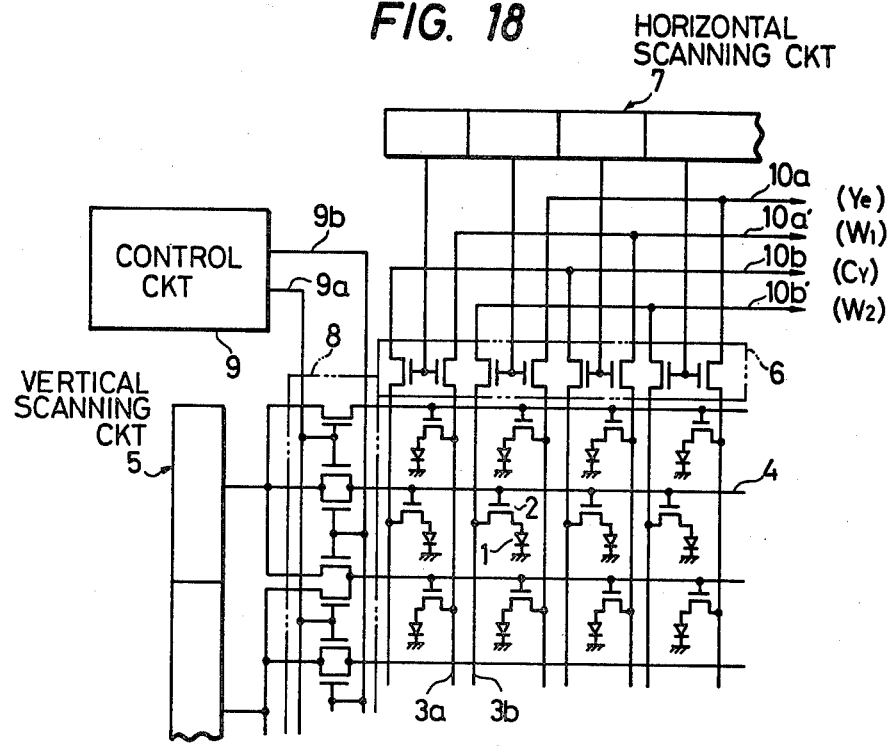
FIGS. 18 and 19 are arrangement diagrams of other solid-state imaging devices which can replace the solid-state imaging device of FIG. 1, respectively.
Figure 19:
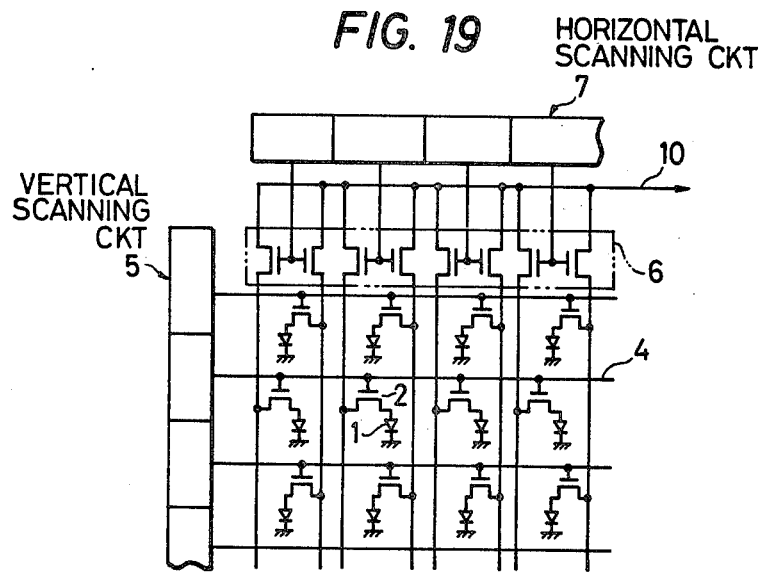

FIGS. 18 and 19 show examples of the structures of other solid-state imaging devices which can replace the imaging device of FIG. 1.

The solid-state imaging device of FIG. 18 is provided with four output lines $10a$, $10a'$, $10b$ and $10b'$, and can read out the respective signals $Y_e$, $W_1$, $C_y$ and $W_2$ in a manner to be separated from one another when the color filter of FIG. 2 is combined therewith. With this solid-state imaging device, accordingly, the separator circuits 24 and 25 can be omitted from the signal processing circuit.

Figure 20:
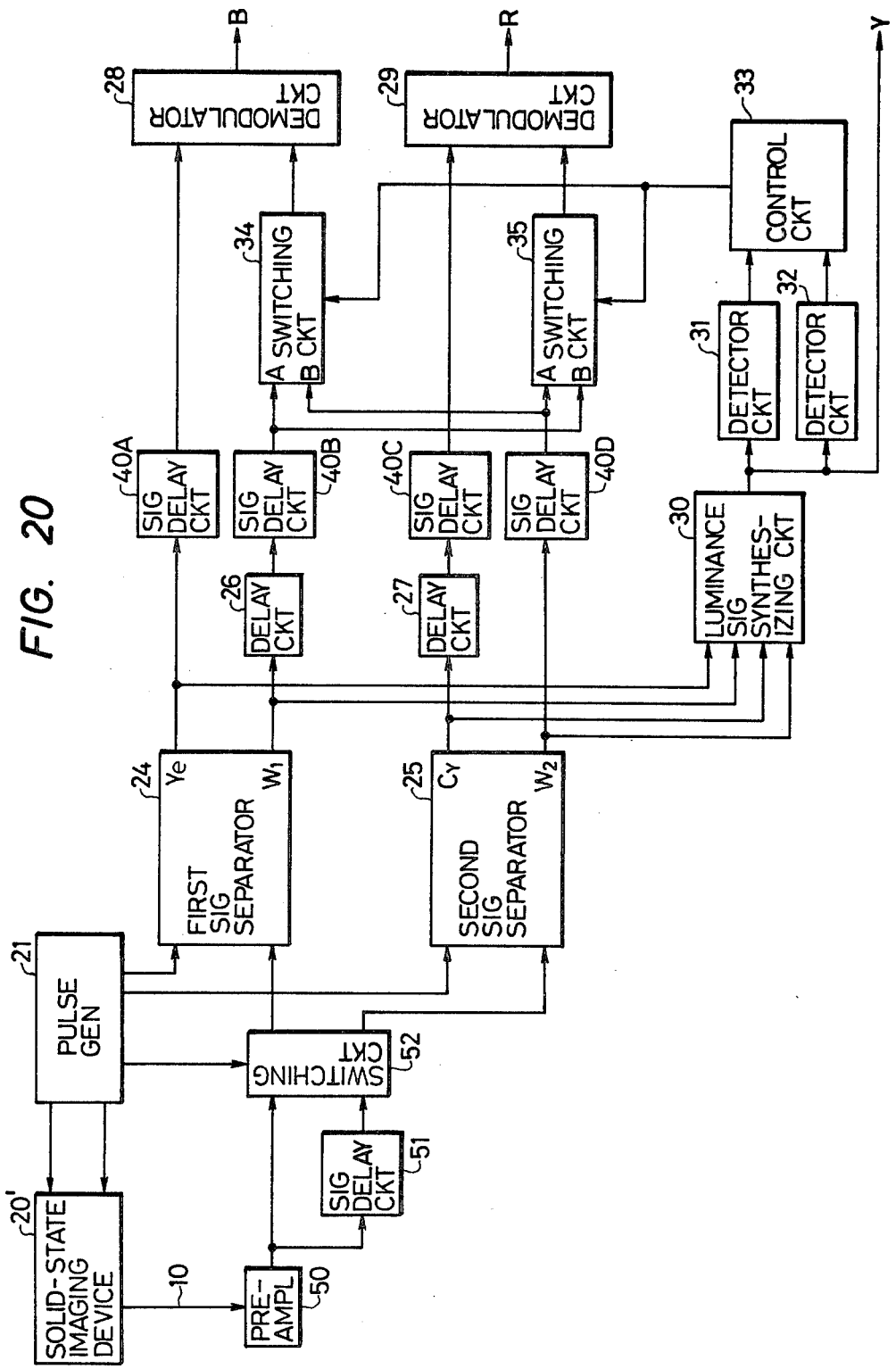
FIG. 20 is a block diagram of a device which is still another embodiment of this invention in the case of employing the solid-state imaging device of FIG. 19.

FIG. 19 shows the solid-state imaging device of the type which has a single output line 10 and in which image signals of one row are read out every horizontal scanning period. In case of employing this solid-state imaging device 20', a measure as shown in FIG. 20 may be taken. An imaging output amplified by a preamplifier 50 is divided into two, one of which is directly applied to a switching circuit 52 and the other of which is applied thereto through a signal delay circuit 51 having a delay time equal to one horizontal scanning period. These input signals are alternately distributed every horizontal scanning by a control signal provided from the pulse generator circuit 21. Thus, the signals of odd lines are supplied to the separator circuit 24, and the signals of even lines to the separator circuit 25.

FIGS. 21 and 22 show other embodiments of color filters applicable to the present invention.

The filter of FIG. 21 is such that green light transmitting filter elements G are arrayed checkerwise, and that in the remaining positions, $C_y$ filter elements and $Y_e$ filter elements are respectively arrayed in odd rows and in even rows. In case of using this filter, the R signal can be demodulated by the operation of $(Y_e-G)$, and the B signal by the operation of $(C_y-G)$. Since the respective filter elements $Y_e$ and $C_y$ have the G filter elements necessary for the color signal demodulating operations in vertical adjacency and lateral adjacency, the color signals free from the false signals can be obtained by a signal processing circuit similar to any of the embodiments already described.

Figure 23:
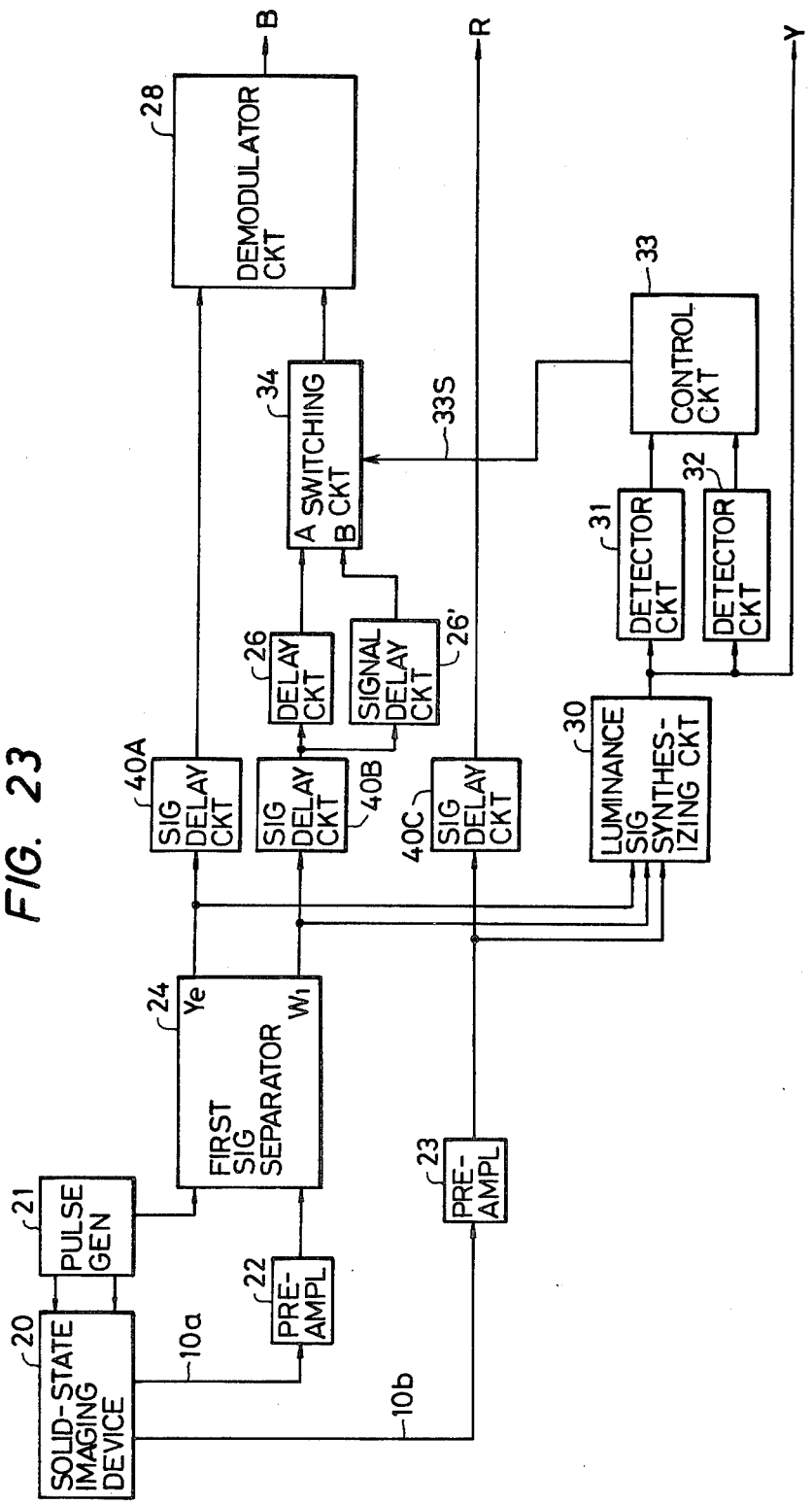
FIG. 23 is a block diagram of a device which is still another embodiment of this invention in the case of employing the color filter of FIG. 22.

The color filter of FIG. 22 is such that in even rows, red light transmitting filter elements R are arranged in stripes, while in odd rows, filter elements W and $Y_e$ are alternately arranged, these filter elements being alternate also in the vertical direction. When this color filter is combined with the solid-state imaging device of FIG. 1, only the R signals are read out onto the output line 10b, and hence, a signal processing circuit can make the output itself of the pre-amplifier 23 the color signal R as illustrated in FIG. 23 by way of example. On the other hand, the B signal is demodulated by the operation of $(W-Y_e)$, but unlike the foregoing case of the first embodiment, the W signal adjacent in the vertical direction cannot be obtained from the circuit of the output line 10b. In the signal processing circuit of FIG. 23, therefore, the W signal separated by the separator circuit 24 is applied to the terminal B of the switching circuit 34 through a signal delay circuit 26' having a delay time equal to one horizontal scanning period, and the W signal having been passed through the delay circuit 26 of the delay time corresponding to one picture element is applied to the terminal A of the switching circuit 34. Thus, the signals of the two W picture elements vertically and laterally related with the $Y_e$ picture element can be derived from the switching circuit 34. Therefore, by controlling this switching circuit with the control circuit output 33S as in the first embodiment, the B signal free from the false signal can be fetched from the demodulator circuit 28. It is obvious that the signal processing circuit of FIG. 23 can be readily modified on the basis of the second and third embodiments and further the embodiments of FIGS. 16 and 17.

As set forth above, the color imaging device of the present invention consists in employing the spatially-multiplexing color filter with which the two sorts of image signals necessary for the color signal demodulating operation are obtained in both the row direction and the column direction, and in demodulating the color signal by selecting in dependence on the direction of the brightness change of a picture to-be-imaged the combination of picture elements in the direction in which no false signal develops. Although the device constructions employig the MOS type solid-state imaging devices have been mentioned as the embodiments, the present invention is also applicable to imaging devices which employ solid-state imaging devices other than the MOS type, for example, CCDs as the photoelectric device. In principle, it is also applicable to a device employing image pickup tubes by separating colors corresponding to the elements of the mosaic color filter.

We claim:

1. In a color imaging device having a filter assembly comprising a plurality of filter members arrayed two dimensionally in rows and columns extending, respectively, in horizontal and vertical directions, the plurality of filter members including a first filter adapted to transmit a specified color light or all colors of light and a second filter formed of a plurality of filter elements adjacent to the first filter in horizontal and vertical directions, at least one of the filter elements being adapted to transmit a color light different from that of the first filter, photoelectric conversion means to recieve an object image through the filter assembly and to convert it into image signals, signal readout means to sequentially read out the image signals from the photoelectric conversion means, a signal processing circuit including color signal demodulation means to form at least one color signal by combining, among the signals from the readout means, an image signal concerning the color light transmitted through the first filter and an image signal concerning the color light transmitted through the second filter, and a circuit which synthesizes a luminance signal out of the image signals from the signal readout means, the improvement comprising sensing means to sense a change in the luminance signal provided from the luminance signal synthesizing circuit in the horizontal or vertical direction, and control circuit means for providing a control signal for controlling said color signal demodulation means so as to select the combination of the image signals transmitted through the vertical or horizontal arranged filter members, respectively, in accordance with an output of said sensing means.

2. A color imaging device as defined in claim 1, wherein said photoelectric conversion means comprises a plurality of photosensors which are arrayed in correspondence with said first and second filters, and said signal readout means sequentially scans two rows of said photosensors adjacent to each other every horizontal period and reads out the image signals from said photosensors onto signal output lines prepared respectively for said first and second filters in each row.

3. A color imaging device as defined in claim 1, wherein said photoelectric conversion means comprises a plurality of photosensors which are arranged in correspondence with said first and second filters, said signal readout means sequentially scans two rows of said photosensors adjacent to each other every horizontal period and reads out the image signals of picture elements from said photosensors onto two signal output lines corresponding to the scanned rows, and said signal processing circuit includes means to separate said image signals read out on said signal output lines, respectively for the corresponding first and second filters.

4. A color imaging device as defined in claim 1, wherein said photoelectric conversion means comprises a plurality of photosensors which are arranged in correspondence with the respective filters, said signal readout means sequentially scans said photosensors horizontally and reads out the image signals of picture elements from said photosensors onto a single signal output line, and said signal processing circuit includes means to separate said image signals of said picture elements respectively for the corresponding color filters in a train of signals preceding one horizontal scanning period as obtained through signal delay means and a train of signals obtained directly from said signal output line.

5. A color imaging device as defined in claim 1, wherein said photoelectric conversion means comprises a plurality of photosensors which are arrayed in correspondence with said first and second filters, and said signal readout means reads out image signals of picture elements from said photosensors.

6. A color imaging device as defined in claim 5, wherein said signal processing circuit includes time adjusting means for supplying the image signals of three picture elements corresponding to said first filter and said second filter having two filter elements as are to be fed to said color signal demodulation means at an identical timing.

7. A color imaging device as defined in claim 5, wherein said color signal demodulation means comprises a selection circuit which delivers a selected one of the image signals from two picture elements corresponding to said second filter in accordance with said control signal, and an arithmetic circuit which forms a first color signal by operating the image signal delivered from said selection circuit and the image signal from a picture element corresponding to said first filter.

8. A color imaging device as defined in claim 7, wherein said selection circuit delivers the image signals from the two picture elements corresponding to said second filter in accordance with said control signal.

9. A color imaging device as defined in claim 5, wherein said color signal demodulation means comprises a first arithmetic circuit which forms a first color signal from said image signals of said two picture elements proximate in the horizontal direction, a second arithmetic circuit which forms the first color signal from said image signals of said two picture elements proximate in the vertical direction, and a circuit which delivers a selected one of the outputs of said two arithmetic circuits in accordance with said control signal.

10. A color imaging device as defined in claim 9, wherein the selection circuit delivers the two color signals in a proportion according to said control signal.

11. A color imaging device comprising a filter assembly including a plurality of filter elements arrayed two dimensionally in rows and columns, the plurality of filter elements including at least first and second filter members alternately arranged in at least one of a row and a column, the at least first and second filter members having different color light transmitting characteristics, photoelectric conversion means being disposed with respect to the filter assembly for receiving an object image through the respective filter members of the filter assembly and for providing image signals in response thereto, signal readout means for sequentially reading out the image signals from the photoelectric conversion means, signal processing means including color signal demodulation means for forming at least one color signal by combining image signals from the signal readout means of at least an image signal relating to the color light transmitted through the first filter member and the color light transmitted through the second filter member, luminance circuit means responsive to the image signals from the signal readout means for synthesizing a luminance signal therefrom, sensing means responsive to the luminance circuit means for sensing a change in value of the luminance signal in at least one of the row and column directions, and control circuit means for providing a control signal in response to an output of the sending means for controlling the color signal demodulation means so as to select a combination of the image signals of the color light transmitted through the first and second filter members for suppressing the generation of a false color signal and for providing a true color signal from the color signal demodulation means.

12. A color imaging device as defined in claim 11, wherein the plurality of filter elements include first and second filter members alternately arranged in alternate rows of the filter assembly and a third filter member having a different color light transmission characteristic than the first and second filter members, the third and first filter members being alternately arranged in rows adjacent the alternate rows formed of the first and second filter members, the color signal demodulation means being responsive to the control signal for selecting the combination of image signals of the color light transmitted through the adjacent first and second filter members in one of the row and column directions to provide the true color signal.

13. A color imaging device as defined in claim 12, wherein the color signal demodulation means includes first and second color demodulators, the first color demodulator combining the image signals transmitted through the adjacent first and second filter members in one of the row and column directions in response to the control signal to provide a first true color signal, and the second color demodulator combining the image signals transmitted through the adjacent first and third filter members in one of the row and column directions in response to the control signal to provide a second true color signal.

14. A color imaging device as defined in claim 13, wherein the first filter member has a panchromatic light transmitting characteristic, the second filter member has a yellow light transmission characteristic, and the third filter member has a cyan light transmission characteristic, the first color demodulator providing a blue color signal, and the second color demodulator providing a red color signal.

15. A color imaging device as defined in claim 13, wherein the first filter member has a green light transmission characteristic, the second filter member has a yellow transmission characteristic and the third filter member has a cyan light transmission characteristic, the first color demodulator providing a blue color signal, and the second color demodulator providing a red color signal.

16. A color imaging device as defined in claim 11, wherein the plurality of filter elements include first and second filter members alternately arranged in alternate rows of the filter assembly and a third filter member having a different color light transmission characteristic than the first and second filter members, the third filter member being arranged in rows adjacent the alternate rows formed of the first and second filter members, the color signal demodulation means being responsive to the control signal for selecting the combination of image signals of the color light transmitted through the first filter member and the color light transmitted through a selected one of the second filter members arranged on opposite sides of the first filter member in the row.

17. A color imaging device as defined in claim 16, wherein the first filter member has a yellow light transmission characteristic, the second filter member has a panchromatic light transmission characteristic, and the third filter has a red light transmission characteristic.

* * * * *